United States Patent
Yamaguchi

(10) Patent No.: US 7,021,828 B2
(45) Date of Patent: Apr. 4, 2006

(54) DIRECT DRIVE UNIT

(75) Inventor: Hiroki Yamaguchi, Hanyu (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/478,463

(22) PCT Filed: Aug. 9, 2002

(86) PCT No.: PCT/JP02/08184

§ 371 (c)(1),
(2), (4) Date: Nov. 21, 2003

(87) PCT Pub. No.: WO2004/015287

PCT Pub. Date: Feb. 19, 2004

(65) Prior Publication Data

US 2004/0151406 A1    Aug. 5, 2004

(30) Foreign Application Priority Data

Aug. 7, 2001    (JP) ............................. 2001-239735

(51) Int. Cl.
*F16C 29/06* (2006.01)

(52) U.S. Cl. .................................................... 384/45
(58) Field of Classification Search .................. 384/45, 384/43, 44; 464/168
See application file for complete search history.

(56) References Cited

U.S. PATENT DOCUMENTS

| | | | |
|---|---|---|---|
| 6,443,620 B1 * | 9/2002 | Chiu et al. | 384/45 |
| 2002/0025087 A1 | 2/2002 | Yamaguchi et al. | |
| 2003/0198409 A1 * | 10/2003 | Yamaguchi et al. | 384/45 |

FOREIGN PATENT DOCUMENTS

| | | |
|---|---|---|
| EP | 1104855 A1 | 6/2001 |
| JP | 63-152023 | 10/1988 |
| JP | 2002130272 A | 5/2002 |

* cited by examiner

*Primary Examiner*—Lenard A. Footland
(74) *Attorney, Agent, or Firm*—Crowell & Moring LLP

(57) ABSTRACT

Operability, low noise characteristic and endurance are further improved at a reduced cost and easily by suppressing the fluctuation of a pitch between rolling elements due to the effects of swelling caused by oil and fats such as lubricants also in a case of using the elastomer for the material of the retaining piece.

In a linear guide device in which a retaining piece 100 made of an elastomeric material is interposed between each of steel balls B adjacent with each other in the circulating direction, the concaved surface 101 of the retaining piece 100 is in contact with the steel ball B adjacent with the retaining piece 100 at a position for 50% or less of the diameter of the steel ball B, and the rigidity value of the retaining piece 100 is defined at 0.053 N/μm or more and 0.175 N/μm or less.

2 Claims, 9 Drawing Sheets

DIRECT DRIVE UNIT

TECHNICAL FIELD

The present invention concerns a linear moving apparatus such as a linear guide device, ball screw device, ball spline device, or linear ball bush device used in industrial machines.

TECHNICAL BACKGROUND

As an existent linear moving device of this type, a linear guide device comprising, for example, as shown in FIG. 9, a guide rail (guide shaft) 1 extending longitudinally in an axial direction and a slider (movable member) 2 movably mounted overriding the guide rail has been known.

Rolling element rolling grooves 3 extending axially are formed on both lateral sides of the guide rail 1, respectively, and a slider main body 2A of the slider 2 has rolling element rolling grooves (not illustrated) formed to the inner lateral surfaces of both sleeves 4 being opposed to the rolling element rolling grooves 3, respectively.

Then, a plurality of steel balls as rolling elements are loaded rotationally between both of the opposed rolling element rolling grooves, and the slider 2 can be moved axially on the guide rail 1 by way of the rolling movement of the steel balls. Along with the movement, the steel balls put between the guide rail 1 and the slider 2 conduct rolling movement and move to the end of the slider main body 2A of the slider 2 and, in order to axially move the slider 2 continuously, the steel balls have to be circulated endlessly.

Then, linear rolling element channels (not illustrated) penetrating in the axial direction are further formed in the sleeves 4 of the slider main body 2A, end caps 5 are formed on both front and rear ends of the slider main body 2A and rolling element circulation R portions 6 curved in a semi-arcuate shape communicating both of the rolling element rolling grooves and the linear rolling element channels (refer to FIG. 10) are formed to the end caps 5, to constitute a rolling element endless circulation tracks 7.

Further, as shown in FIG. 10, between each of the steel balls B adjacent with each other in the rolling element endless circulation track 7, a retaining piece 9 having concaved surfaces 8 on both lateral surfaces opposing to the steel balls B is formed such that it is in contact at the concaved surfaces 8 with the steel ball B. It has been proposed, for example, as shown in Japanese Unexamined Patent Application No. 2000-120825, a retaining piece that does not reduce the load capacity and the rigidity even in a case where the spacer (retaining piece) is disposed between loaded balls and that can decrease friction between the loaded ball and the spacer to improve the circularity of the spacer.

However, in the existent retaining piece, since the rolling element endless circulation track 7 comprises a linear rolling element channel and a curved rolling element circulation R portion 6, and the rigidity value of the retaining piece is large as well, a difference is caused between a minute moving amount $dx_1$ of a steel ball that moves finely from the linear rolling element channel on the loaded side to the curved rolling element circulation R portion 6 on the non-loaded side, and a minute moving amount $dx_2$ of a steel ball that moves finely from the curved rolling element circulation R portion 6 on the non-loaded side to the linear rolling element channel on the loaded side, corresponding to the minute moving amount $dx_1$ in view of a geometrical relation, to result in problems that the difference causes zig-zag phenomenon or fluctuation in the dynamic friction of the steel balls to hinder the smooth revolutional movement of the steel ball (motion along the circulation channel) making it difficult to improve the operability further.

In view of the above, for further improvement of the operability and the low noise property by the adsorption of difference between the minute moving amount $dx_1$ and the minute moving among $dx_2$, the present applicants previously proposed the specification of Japanese Patent Application No. 2000-203324 in which it is described that a retaining piece is provided with resiliency and that the rigidity value is preferably 0.053 N/µm or more and 0.175 N/µm or less in view of the operability and the endurance.

However, in a case of using an elastomeric material such as HIGHTREL or PERPREN (trade name of products manufactured by Toyo Boseki Co.) in order to obtain the above described value for the retaining piece easily and at a reduced cost, the retaining piece is swollen with oil and fats such as lubricants to greatly fluctuate the pitch between steel balls depending on the position of contact between the steel ball and the retaining piece. Then, the fluctuation may possibly change the amount of gap in a series of row of rolling elements (comprising rolling elements and retaining pieces put between the rolling elements) that circulate through the rolling element endless circulation track 7 to result in problems of giving undesired effects on the operability and the low noise property and also giving undesired effects on the durability in a case where the change of the gap amount is remarkable.

The present invention has been accomplished in order to overcome such disadvantages and it is an object thereof to provide a linear moving device capable of suppressing the fluctuation of a pitch between rolling elements due to the effect of swelling caused by oil and fats such as lubricants also in a case of using an elastomeric material for the material of the retaining piece thereby providing a further improvement for the operability, low noise property and durability at a reduced cost and easily.

DISCLOSURE OF THE INVENTION

For attaining such an object, the present invention provides a linear moving device comprising a guide shaft with a rolling element rolling groove and a movable member, the movable member having rolling element rolling groove opposed to the rolling element rolling groove of the guide shaft, moving relatively being guided by the guide shaft by way of rolling motion of a plurality of rolling elements inserted between the rolling element rolling grooves, having a rolling element endless circulation track for endlessly circulating the rolling elements, and having a retaining piece interposed between each of the rolling elements adjacent with each other in the circulating direction, wherein the retaining piece is in contact with the rolling element adjacent with the retaining piece at a position for 50% or less of the diameter for the rolling element.

Further, other invention has a feature in which the retaining piece is in contact with the rolling member at a position for 30 to 50% of the diameter for the rolling element adjacent with the retaining piece.

Further, other invention has a feature that the rigidity value of the retaining piece is 0.053 N/µm or more and 0.175 N/µm or less.

BEST MODE FOR PRACTICING THE INVENTION

Figure 1:
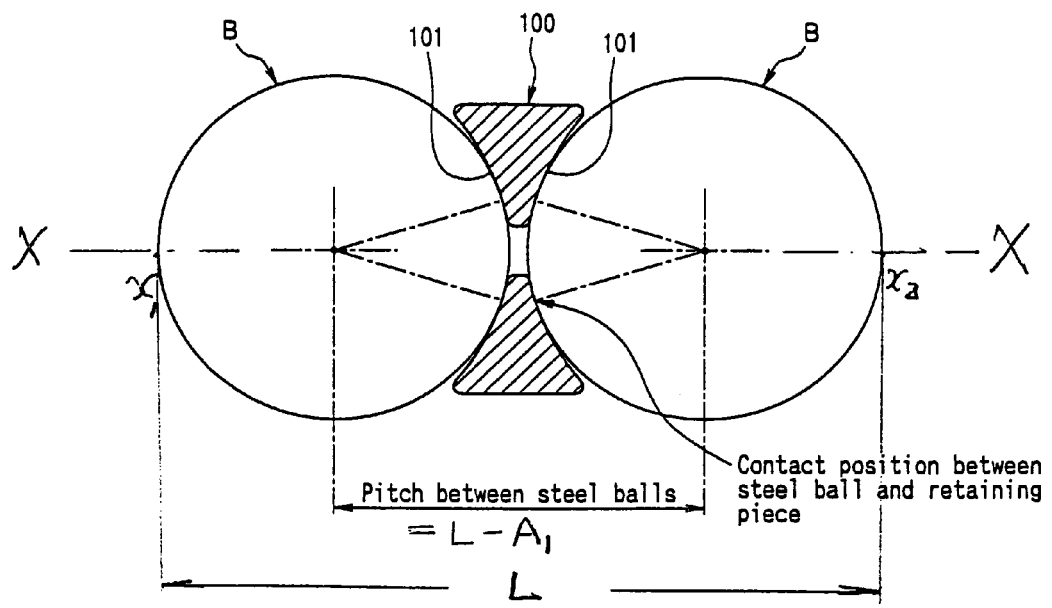
FIG. 1 is an explanatory cross sectional view for explaining a retaining piece of a linear guide device as an example of an embodiment according to the present invention.
Figure 2:
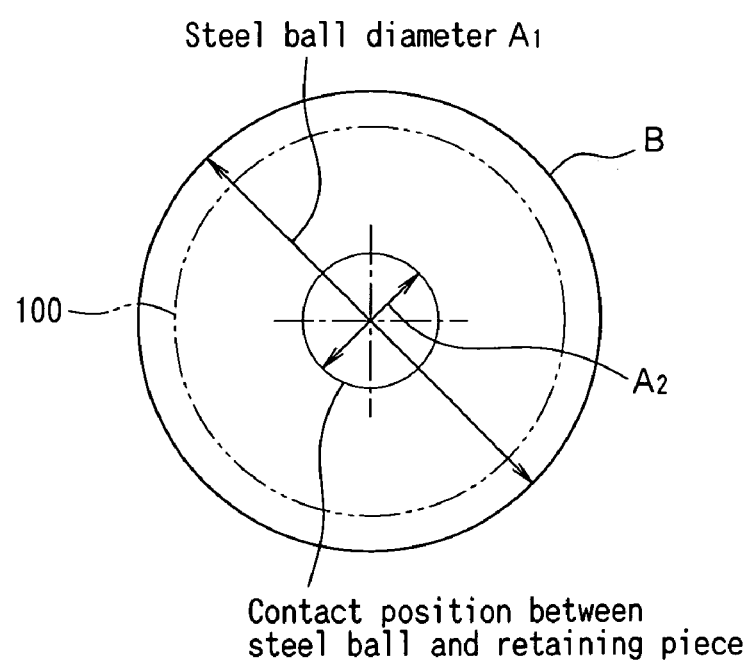
FIG. 2 is a right side elevational view of FIG. 1.
Figure 3:
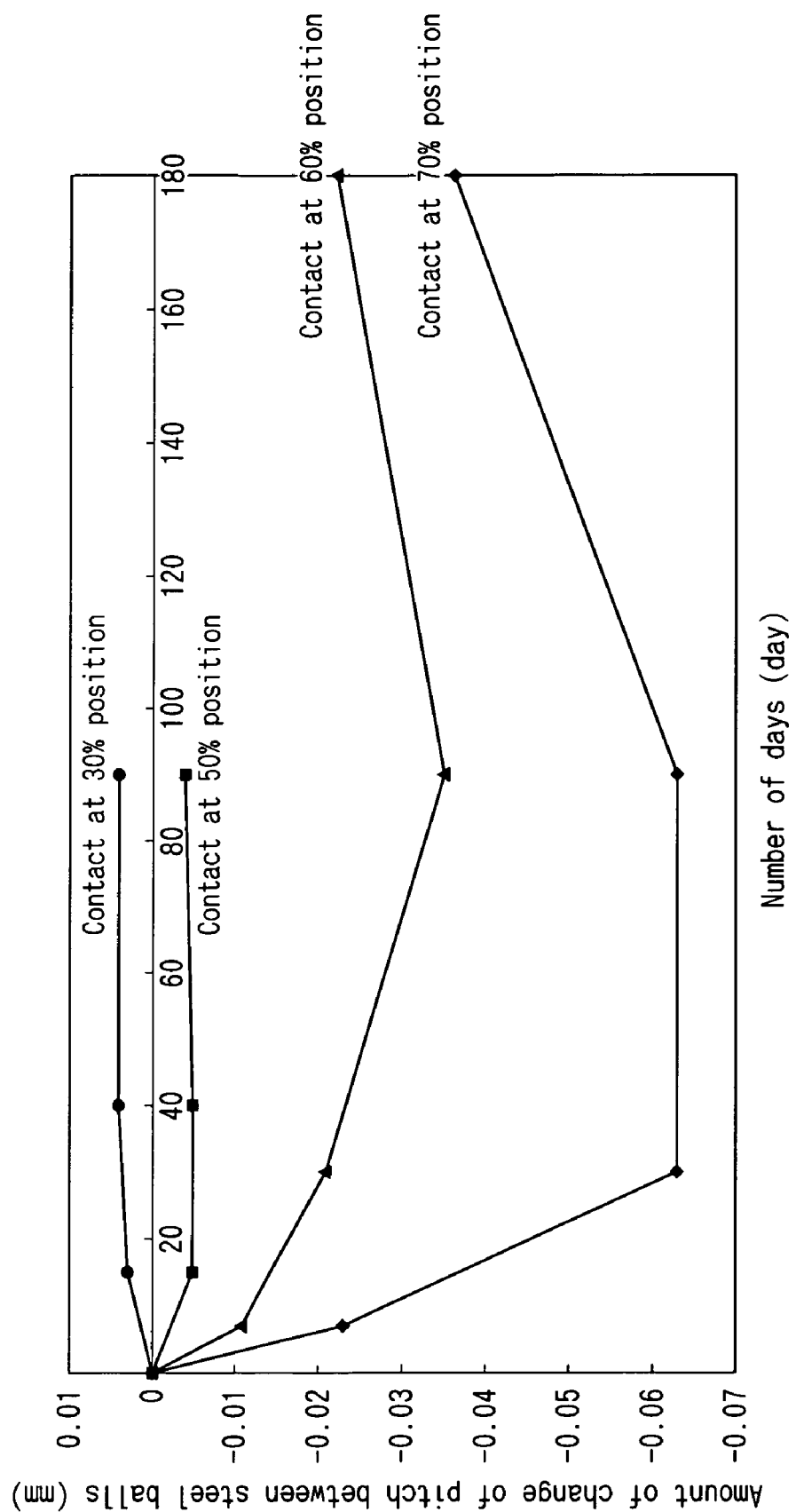
FIG. 3 is a graph showing a relation for the amount of change of a pitch between steel balls, the number of days and the contact position of the retaining piece with the steel ball.
Figure 4B:
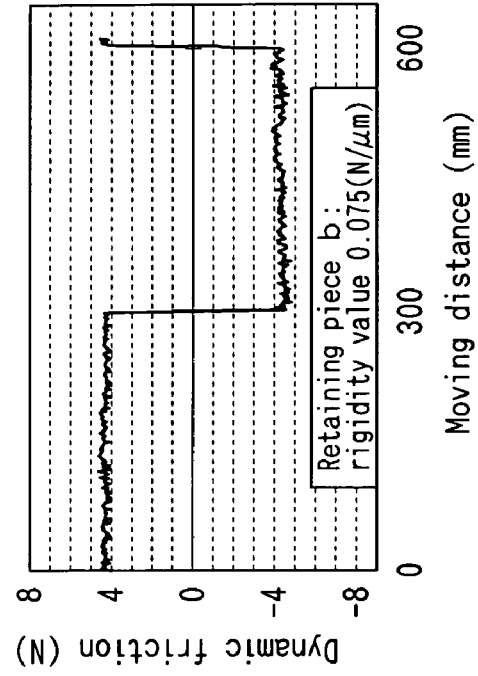
FIGS. 4A to 4D are graphs showing the fluctuation of dynamic friction in a linear guide device in a case of interposing four kinds of retaining pieces having a rigidity value lower than the existent case between the steel balls.
Figure 4D:
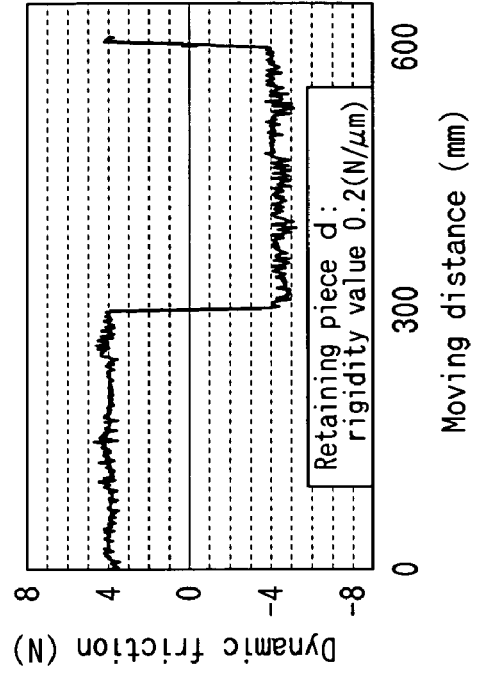
Figure 4A:
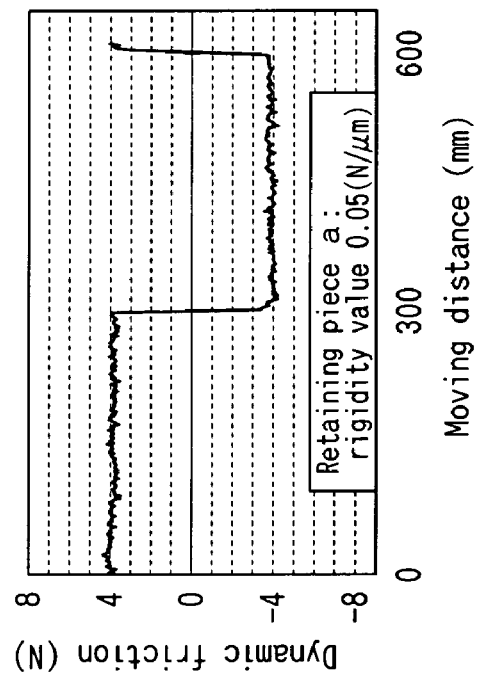
Figure 4C:
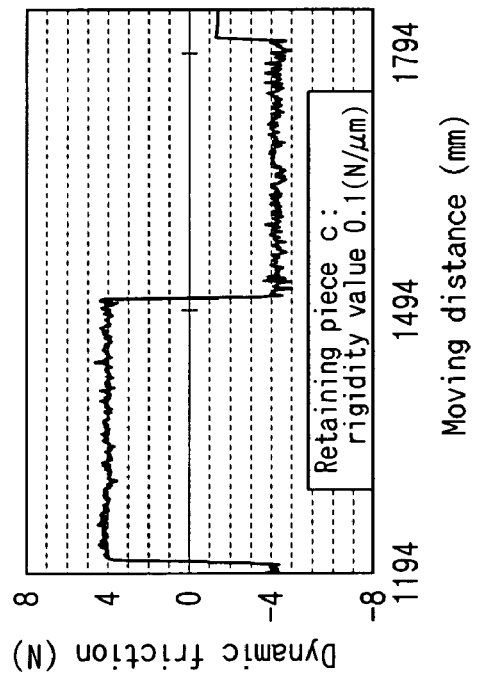
Figure 5:
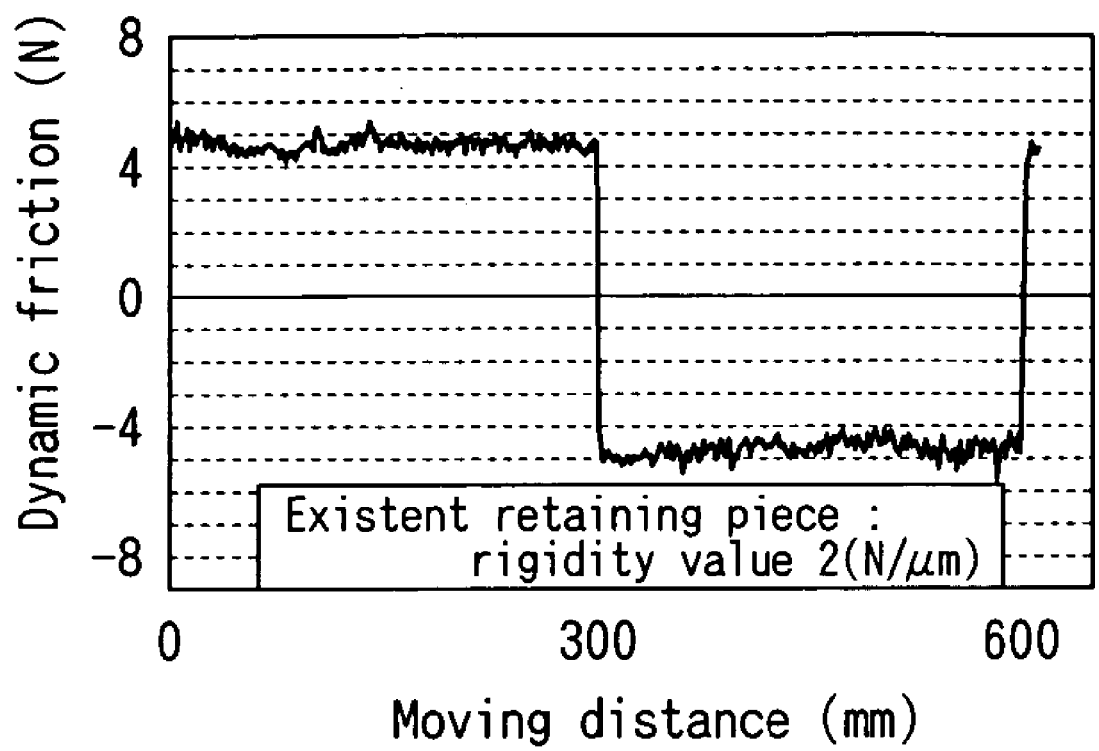
FIG. 5 is a graph showing the fluctuation of dynamic friction in a linear guide device in which an extent retaining pieces is interposed between steel balls.
Figure 6:
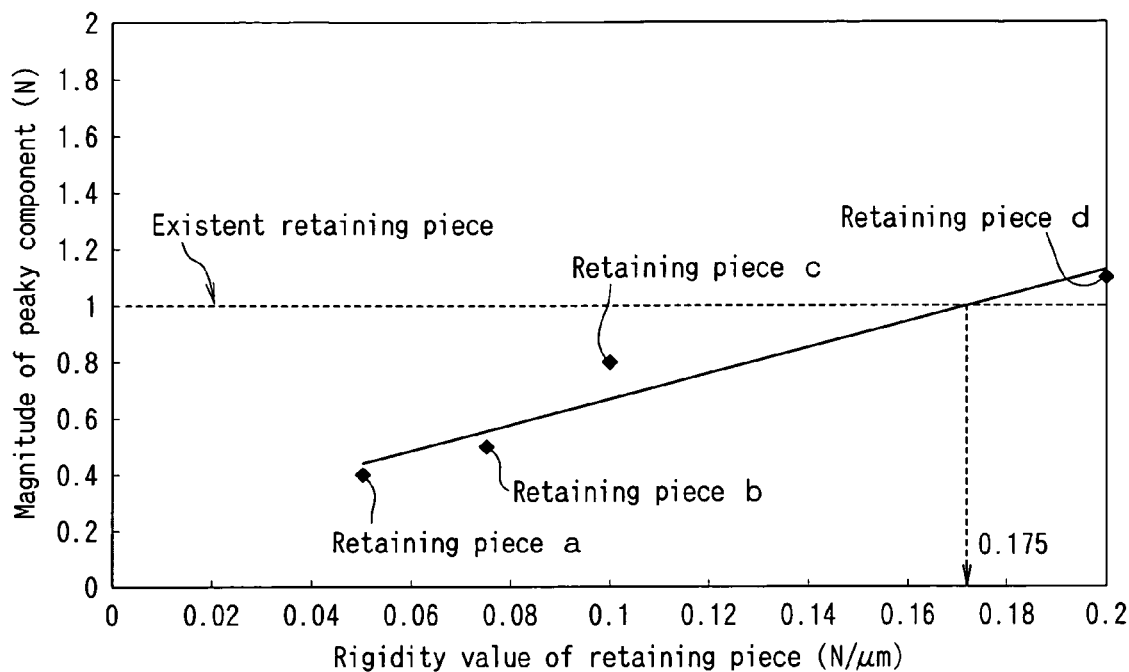
FIG. 6 is a graph showing a relation between the size of peaky components and the rigidity value of the retaining piece.
Figure 7:
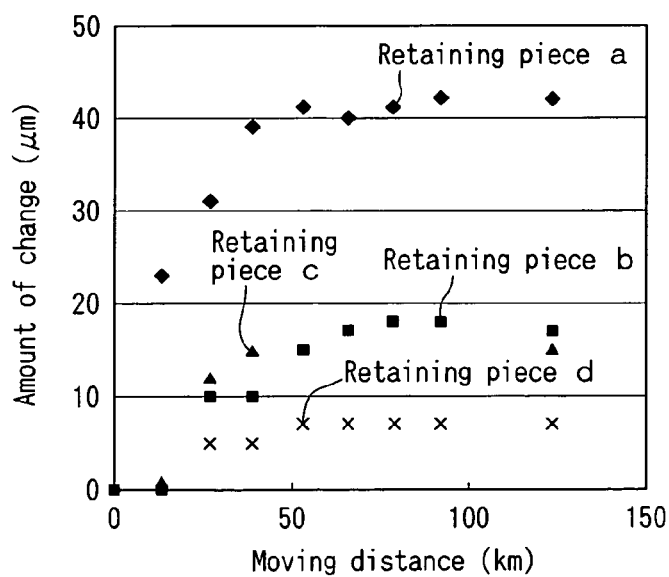
FIG. 7 is a graph showing a relation between the moving distance and the amount of change for each of retaining pieces with different rigidity values.
Figure 8:
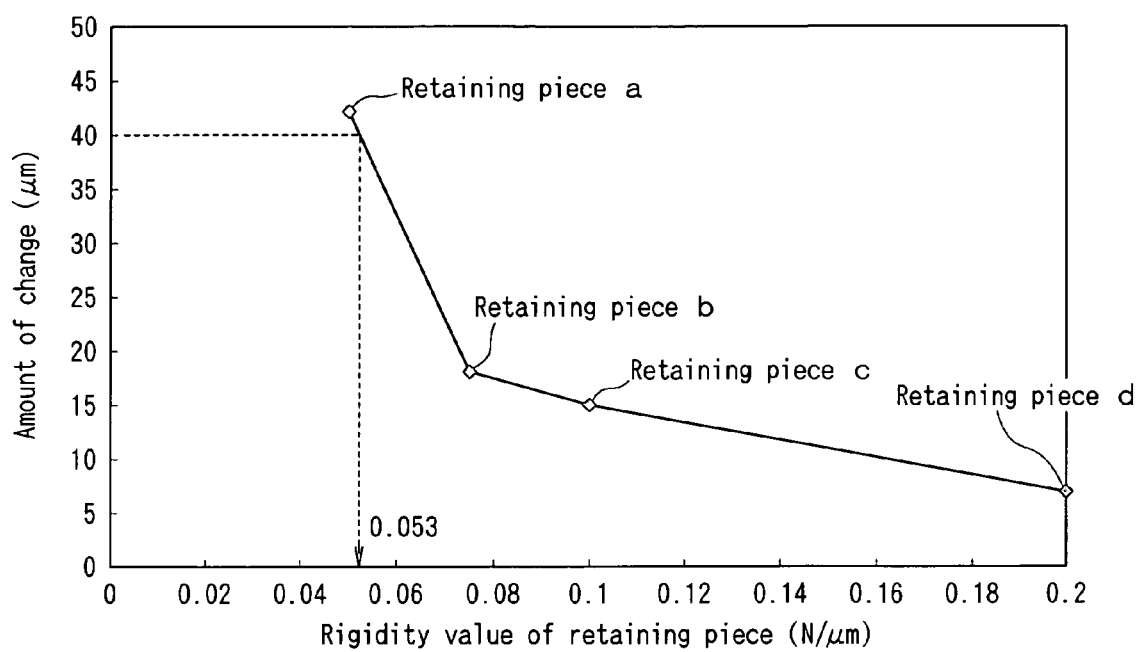
FIG. 8 is a graph showing a relation between the rigidity value and the amount of change for each of retaining pieces.
Figure 9:
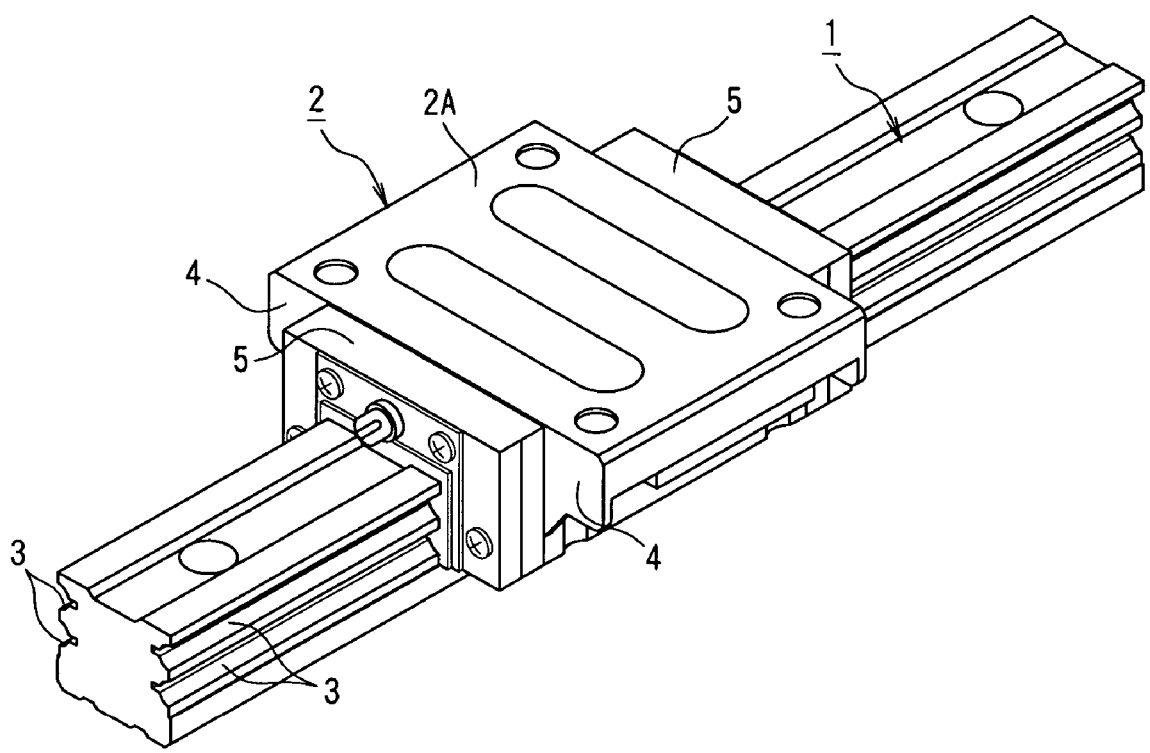
FIG. 9 is an explanatory perspective view for explaining an entire constitution of a linear guide device.
Figure 10:
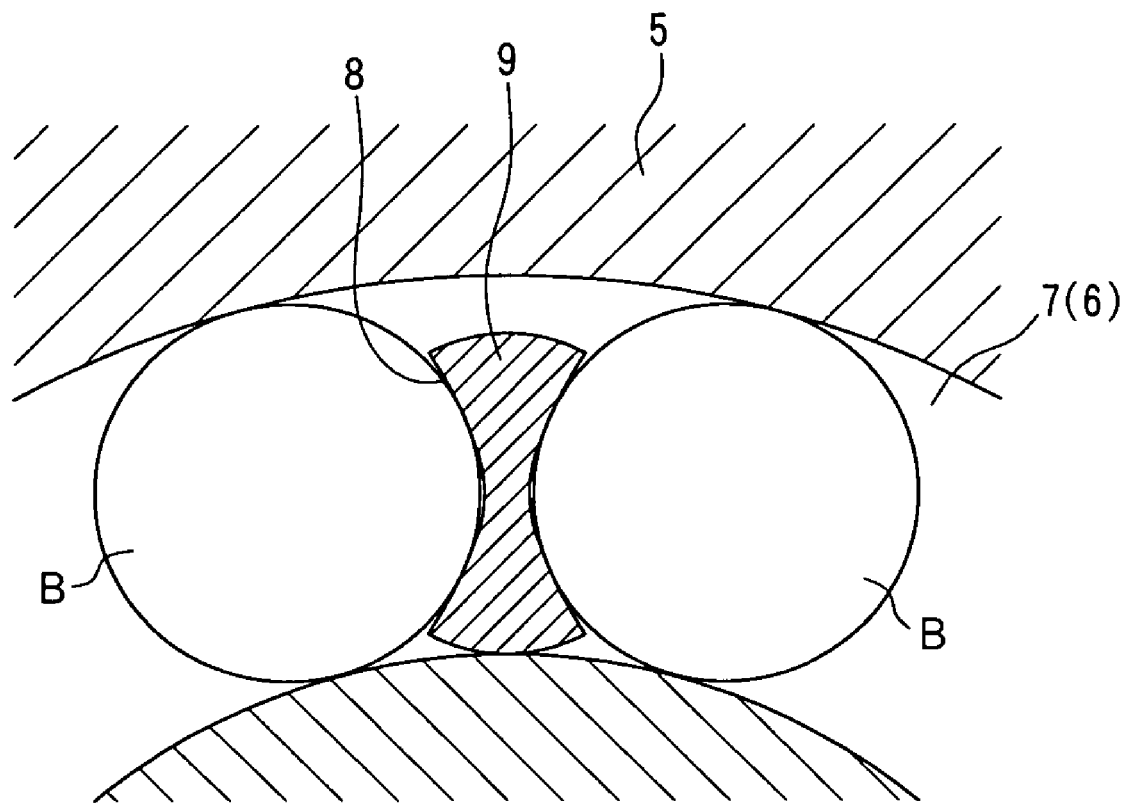
FIG. 10 is an explanatory view for explaining an existent retaining piece.

An example of an embodiment according to the present invention is to be described with reference to the drawings. FIG. 1 is an explanatory cross sectional view for explaining a retaining piece of a linear guide device as an example of an embodiment according to the present invention, FIG. 2 is a right side elevational view of FIG. 1, FIG. 3 is a graph showing a relation for the amount of change of a pitch between steel balls, the number of days and the contact position of the retaining piece with the steel ball, FIGS. 4A to 4D are graphs showing the fluctuation of dynamic friction in a linear guide device in a case of interposing four kinds of retaining pieces having a rigidity value lower than the existent case between the steel balls, FIG. 5 is a graph showing the fluctuation of dynamic friction in a linear guide device in which an extent retaining pieces is interposed between steel balls, FIG. 6 is a graph showing a relation between the size of peaky components and the rigidity value of the retaining piece, FIG. 7 is a graph showing a relation between the moving distance and the amount of change for each of retaining pieces with different rigidity values, FIG. 8 is a graph showing a relation between the rigidity value and the amount of change for each of retaining pieces. Since the linear guide device of this embodiment is different from the existent linear guide devices shown in FIG. 9 only in that the retaining piece interposed between the steel balls adjacent with each other in the rolling element endless circulation track, description is to be made only for the different portions.

As shown in FIG. 1, a retaining piece 100 is interposed between steel balls B adjacent with each other in a rolling element endless circulation track 7. The retaining piece 100 is formed into a short cylindrical shape, for example, with an elastomeric material HIGHTREL or PERPREN (trade name of products manufactured by Toyo Boseki Co.) and formed with a concaved surface 101 having a predetermined radius of curvature on both axial end faces.

Then, in this embodiment, the concaved surface 101 of the retaining piece 100 is in contact with a steel ball B adjacent with the retaining piece 100 at a position for 30 to 50% of the diameter $A_1$ of the steel ball B (position where $A_2/A_1 \times 100\%$ is 30 to 50% in FIG. 2), and the rigidity value of the retaining piece 100 is defined as 0.054 N/μm or more and 0.175 N/μm or less. This can suppress the fluctuation of the pitch between the steel balls B due to the effect of swelling caused by oil and fats such as lubricants and can attain a further improvement of operability, low noise property and endurance, at a reduced cost and easily even in a case of using the elastomeric material as the material of the retaining piece 100.

The rigidity value means herein "ratio of change of a pitch between steel balls B relative to a compressive force applied between the steel balls B" when the retaining piece 100 is interposed between the two sphere balls B, that is, rigidity value (N/μm)=compressive force (N) applied between steel balls B/amount of change (μm) of pitch between steel balls B.

Description is to be made specifically.

FIG. 3 shows the result of an immersion test in which four types of test retaining pieces were provided such that the positions of contact between the steel ball and the concaved surface of the retaining piece made of the elastomeric material were set to 70%, 60%, 50%, and 30% for the steel ball diameter respectively, and the extent of swelling caused by the lubricant (Showa Shell AV2 grease). In FIG. 3, the ordinate expresses the amount of dimensional change of the pitch between steel balls and the abscissa expresses a number of day lapsed in a case of using a test retaining piece.

It can be seen from the figure that the change with time of the pitch between the steel balls due to the swelling caused by oil and fats such as lubricants can be minimized by restricting the position of contact between the steel ball and the concaved surface of the retaining piece to 50% or less of the steel ball diameter, even in a case of using a retaining piece made of the elastomeric material.

In a case where the amount of change of the pitch between the steel balls is within ±10 μm or less, there is no more undesired effect on the durability and undesired effect on the operability and the low noise property can be decreased remarkably. Further, in a case where the amount of change of the pitch between the steel balls is ±5 μm or less, there is no more undesired effects on the operability or the low noise property. Accordingly, the amount of change of the pitch between the steel balls is preferably ±10 μm or less and, in view of the operability and the low noise property, the amount of change of the pitch between the steel balls is more preferably ±5 μm or less.

Further, in view of FIG. 3, when the position of contact between the steel balls and the concaved surface of the retaining piece is intended to be between 30 to 50%, the amount of change of pitch between the steel balls due to the displacement of point of contact (position of contact) caused by the swelling of the retaining piece made of the elastomeric material and the amount of change of the pitch between the steel balls due to increase in the thickness caused by the swelling of the material itself are balanced and the change of amount of the pitch between the steel balls can be minimized.

As described above, when the retaining piece is adapted to have such a concaved shape that the steel ball adjacent with the retaining piece is in contact at a position for 50% or less of the steel ball diameter to provide a stable pitch between the steel balls, fluctuation of the pitch between the steel balls due to the effect of the swelling caused by oil and fats such as lubricants can be minimized and deterioration of the operability, low noise property and endurance due to the increase or decrease of the gap in the row of steel balls can be prevented even in a case of forming the retaining piece with the material such as the elastomeric material.

Then, the ground for determining the rigidity value of the retaining piece as 0.053 N/μm or more and 0.175 N/μm or less is to be described.

FIGS. 4A to 4D show fluctuation of dynamic friction of a linear guide device in a case of interposing four types of retaining pieces a–d having lower rigidity values than usual (rigidity value of 0.05, 0.075, 0.1, 0.2 N/μm), FIG. 5 shows fluctuation of dynamic friction of a linear guide device in a case of interposing an existent retaining piece (at a rigidity value of 2 N/μm) between the steel balls, and FIG. 6 shows a relation between the magnitude of the peaky components as a measure for the operability based on the data of FIGS. 4A to 4D and FIG. 5 (minute fluctuation of dynamic friction: the operability is better as fluctuation is smaller), and the rigidity value of the retaining piece.

As apparent from FIG. 6, the rigidity value is 0.175 N/μm or less which is smaller than the magnitude of the peaky component of 1 N in a case of using the existent retaining piece and, accordingly, it can be seen that the operability is improved in a region where the rigidity value of the retaining piece is 0.175 N/μm or less. Further, in view of FIG. 6, it can be seen that the operability is improved more as the rigidity value of the retaining pieces is smaller, but it may sometimes result in a problem for the amount of change of the pitch between the steel balls as the sum of the value for the permanent deformation of the pitch between the rolling elements caused by the bending force in the circulation R portion and repetitive stresses exerting during rolling movement and the amount of deformation due to the effects caused by swelling with oil and fats such as lubricants, that is, the durability as the rigidity value of the retaining piece is smaller.

FIG. 7 shows a relation between the moving distance of each of the retaining pieces and the amount of deformation that expresses the durability for retaining pieces a-d and FIG. 8 shows a relation between the amount of change of the pitch between the steel balls and the rigidity value of the retaining piece at the moving distance of about 125 km. In a usual linear guide device incorporated with retaining pieces, when the amount of change of 40 μm or more should occur, the size of gap in the row of steel balls is excessively large to hinder the smooth revolution of the steel balls and the retaining pieces and remarkably deteriorate the durability. Accordingly, it can be seen from FIG. 8 that the rigidity value of 0.053 N/μm or more is necessary for the retaining piece.

From the foregoings, the rigidity value of the retaining piece is defined as 0.053 N/μm or more and 0.175 N/μm or less.

Since the retaining piece having the rigidity value as described above is interposed between the rolling elements, even in a case where compressive force exerts in the row of rolling elements due to the scattering of the track length caused by fabrication errors or the like for components, it is possible to ensure the operability and noise characteristics at the level being equal with that of linear guide devices incorporated with existent retaining pieces.

Further, when the present invention is applied, while it is desirable that the retaining pieces of the invention are interposed between all of the steel balls, also in a case where the retaining piece of the invention is not interposed in one or small number of plural portions, the effect of improving the operability and the noise characteristics can be recognized more than the existent products not using the retaining piece of the invention. In this case, it is effective that the portions not interposed with the retaining pieces of the invention are in symmetry with each other in view of the row of steel balls (so that not interposed portions are not in contiguous).

In the embodiment described above, the shape of the concaved surface of the retaining piece is defined as an R shape of a curvature similar with the radius of the steel ball but it is not restricted only thereto. For example, the shape for the concaved surface of the retaining piece at a portion in contact with the steel ball may be a gothic shape or a conical shape, or a spherical shape such that contact may be made at the edge of the spherical surface and the steel ball. It is important for the accuracy control of the retaining piece that it has such a concaved surface shape to provide a stable pitch between steel balls upon in contact with the steel ball. Further, in a case of using the retaining piece for the linear guide device, the retaining pieces may be separated individually or connected with each other.

Furthermore, in the embodiment described above, a cylindrical retaining piece is used but it is not limitative and, for example, a columnar retaining piece may also be used.

Furthermore, while the steel ball is shown as the example of the rolling element, it is not limitative but may be a ball such as of ceramic ball or the present invention is applicable also in a case of using rolls.

Furthermore, while an example of applying the present invention to the linear guide device is adopted as the embodiment, but it is not limitative but the present invention is applicable also to a linear moving device such as a ball screw device, ball spline device or linear ball bush device.

INDUSTRIAL APPLICABILITY

As is apparent from the foregoing descriptions, since the fluctuation of the pitch between the rolling elements due to the effect of swelling caused by oil and fats such as lubricants can be suppressed also in a case of using the elastomer for the material of the retaining piece, further improvement can be attained at a low cost and easily for the operability, the low noise characteristic and the endurance.

The invention claim is:

1. A linear moving device comprising a guide shaft with a rolling element rolling groove and a movable member, the movable member having a rolling element rolling groove opposed to the rolling element rolling groove of the guide shaft, moving relatively being guided by the guide shaft by way of rolling motion of a plurality of rolling elements inserted between the rolling element rolling grooves, having a rolling element endless circulation track for endlessly circulating the rolling elements, and having a retaining piece intervened between each of the rolling elements adjacent with each other in the circulating direction, wherein the retaining piece is in contact with the rolling element adjacent with the retaining piece at a position for 50% or less of the diameter for the rolling element, and a rigidity value of the retaining piece is defined as 0.053 N/μm or more and 0.175 N/μm or less.

2. A linear moving device according to claim 1, wherein the retaining piece is in contact with the rolling element adjacent with the retaining piece at a position for 30 to 50% of the diameter for the rolling element.

* * * * *